United States Patent [19]

Staar

[11] B 3,997,916
[45] Dec. 14, 1976

[54] TAPE RECORDERS

[75] Inventor: Theophiel Clement Jozef Lodewijk Staar, Kraainem, Belgium

[73] Assignee: Staar, S.A., Brussels, Belgium

[22] Filed: July 23, 1974

[21] Appl. No.: 491,111

[44] Published under the second Trial Voluntary Protest Program on February 17, 1976 as document No. B 491,111.

[30] Foreign Application Priority Data

Aug. 14, 1973  Belgium .............................. 44280

[52] U.S. Cl. .................................................. 360/60
[51] Int. Cl.$^2$ .................................... G11B 15/04
[58] Field of Search ................................. 360/60

[56] References Cited
UNITED STATES PATENTS

3,677,556   7/1972   Oosone ............................ 360/60

Primary Examiner—James W. Moffitt
Attorney, Agent, or Firm—Leydig, Voit, Osann, Mayer & Holt, Ltd.

[57] ABSTRACT

Apparatus for preventing the undesired erasure of a magnetic tape in a tape recorder which receives a tape cartridge and has the capability of recording in either direction of tape travel in the cartridge without the necessity of removing and reversing the cartridge. The apparatus includes means for detecting the presence of removable recording permission tabs on the tape cartridge and, depending on the instantaneously commanded direction of tape transfer, generating signals which will prevent recording if the tab corresponding to the track presented to the recording head during the existing direction of tape travel has been removed.

3 Claims, 4 Drawing Figures

TAPE RECORDERS

BACKGROUND OF THE INVENTION

1. Field of the Invention

The present invention relates to the recording of information on magnetic tapes and particularly to prevention of the accidental erasure of magnetic tapes. More specifically, this invention is directed to apparatus which cooperates with a self-contained magnetic tape cartridge to prevent the recording of information on a magnetic tape having stored thereon pre-recorded information which is to be retained. Accordingly, the general objects of the present invention are to provide novel and improved methods and apparatus of such character.

2. Description of the Prior Art

While not limited thereto in its utility, the present invention is particularly well suited for use in tape recorders of the type which receive a tape cartridge or cassette and wherein playback may be effected in either direction of travel of the tape.

Commercially available tape cartridges are provided with means which cooperate with sensing and control apparatus on the tape recoder for preventing the inadvertent erasure of signals previously recorded on the magnetic tape. Such erasure prevention means will typically comprise a pair of detachable tongues or tabs disposed adjacent the ends of the edge of the cartridge positioned opposite to the edge through which the tape is presented to the playback or recording head. In order to prevent inadvertent erasure of information on the tape, or on one track of the tape, the tabs or appropriate tab is removed from the cartridge. Thereafter, when the cartridge with the tab removed is introduced into the tape recoder, apparatus on the recorder detects the absence of the tab and commands a control mode which prevents recording. In this manner recording on the track associated with the removed cartridge tab, which would result in the erasure of the previously recorded information, is prevented. When the cartridge is turned over to thereby permit use of the second track, the presence or absence of the tab on the opposite end of the cartridge will be sensed and recording on the second track will be prevented or enabled as appropriate.

In the interest of avoiding the necessity of removing and turning over the cartridge after the magnetic tape has been completely transferred from a first to a second or take-up reel within the cartridge, the transfer having occurred during playback of or recording on a first track, it has been proposed to provide tape recoders with the capability of allowing the tape to run in either direction at normal speed thus permitting utilization of a second track when the tape drive is reversed. This arrangement permits playback or recording on a first track with the tape moving in a first direction and, after the tape has been completely transferred, the playback or recording may be continued on a second track as the tape moves in the opposite direction. The tape recorder will normally also be able to rapidly rewind the tape in either direction without playback or recording.

As used herein it is to be understood that the term "track" refers to that portion of the magnetic recording medium which is employed in each direction of movement of the tape. Thus, the term track encompasses a plurality of channels which are recorded or replayed simultaneously as is common in stereophonic equipment.

As previously noted, in conventional tape recorders which provide for the turning over of the cartridge in order to permit utilization of both tracks, the reversal of the cartridge presents the tab or other indicating portion of the tape cartridge to a detecting or sensing mechanism in the recorder. The sensing mechanism controls whether recording will be permitted on the track to be presented to the recording-playback head. On tape recorders which have the capability of transferring the tape in either direction at the normal or playback speed, there is presently no apparatus available which for both directions of travel, provides a signal which indicates whether recording is to be prevented or permitted. The presently available detecting devices, as used on recorders which require reversal of the cartridge, are not suitable for use on such reversible recording apparatus since the detecting devices can perform their required control function in only one direction of movement of the tape. Thus, the presently available apparatus will continue, in accordance with the signal provided for the first direction of tape movement, to enable or prevent the recording for the second direction of movement. Obviously, this manner of operation could result in an undesired erasing of the tape track corresponding to the second direction of tape transfer or unwanted prevention of recording during the second direction of tape movement.

It has been proposed to provide for the simultaneous detection of the state of the tab or other indicia providing device at the two ends of the cartridge and to prevent recording when a signal commensurate with a desire to retain recorded information is detected at either of the opposite ends of the cartridge. While this would eliminate the risk of inadvertent erasure, it would also substantially reduce the flexibility of the recording apparatus by reducing the complete utilization of the recording possibilities.

SUMMARY OF THE INVENTION

The present invention overcomes the above briefly discussed and other deficiencies and disadvantages of the prior art by the provision, in a tape recorder having the capability of recording and playback in both directions of tape transfer, of means which cooperates with the tape cartridge to control the energization of the recording mechanism separately for each direction of travel of the tape. Thus, in accordance with the present invention, inadvertent or undesired erasure of a magnetic tape is prevented in dependence upon information carried by the tape cartridge under the control of means which is responsive to the direction of winding of the tape.

Apparatus in accordance with the present invention may include mechanical control means connected to the means which senses the record/erasure prevention information carried by the cartridge. Alternatively, the present invention may include electromechanical control means responsive to the erasure prevention information carried by the cartridge.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENTS

Figure 1:
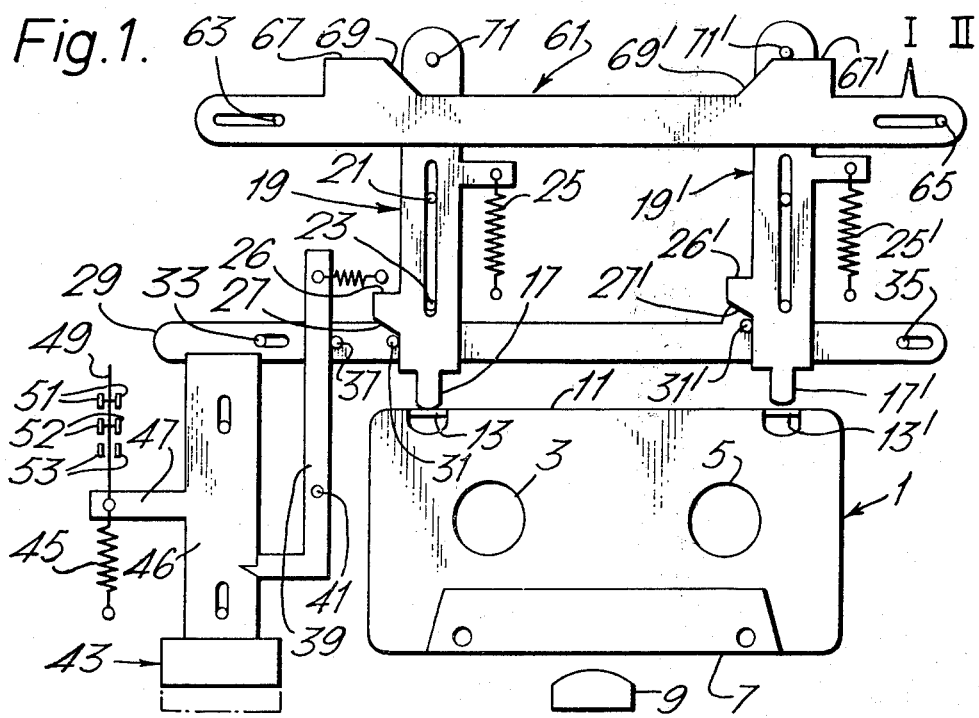
FIGS. 1, 2 and 3 are schematic plan views of a mechanical erasure prevention safety mechanism for a tape recorder in accordance with a first embodiment of the present invention.
Figure 2:
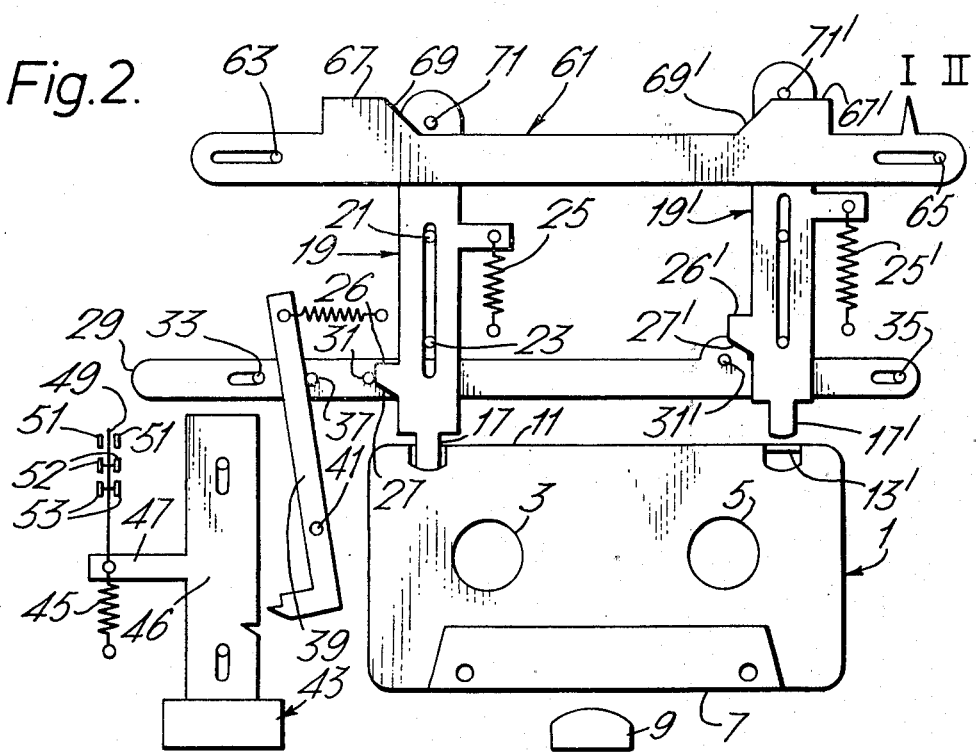
Figure 3:
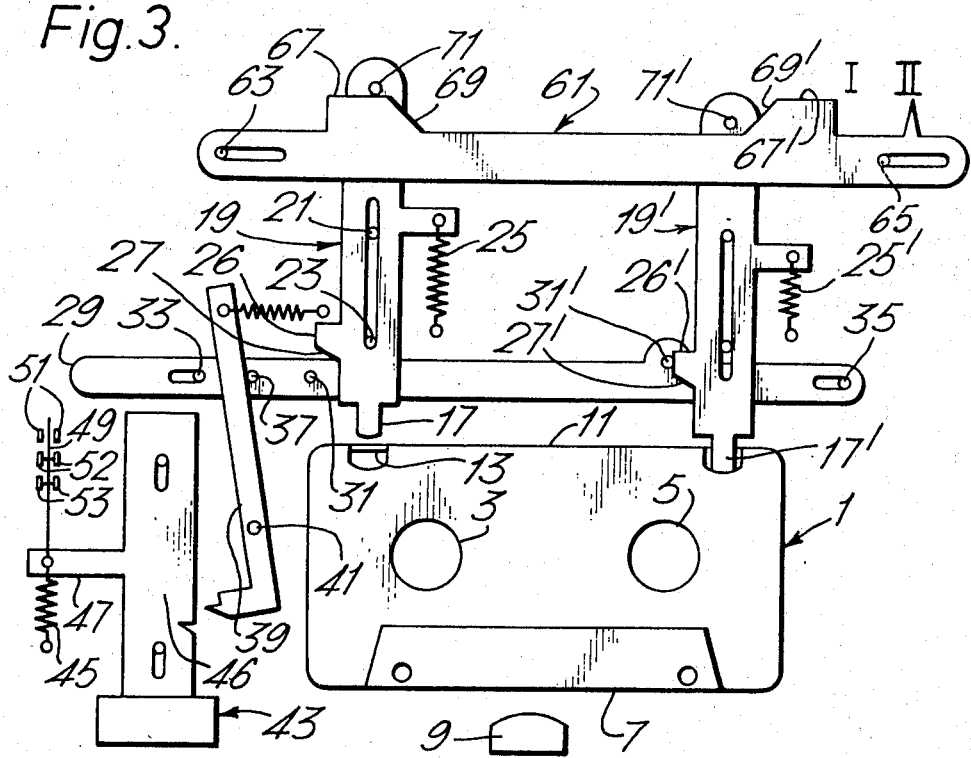

Referring to the drawing, and particularly FIGS. 1–3 thereof, a commercially available tape cartridge or cassette of conventional design is indicated generally at 1. The tape cartridge 1 contains the magnetic tape which is wound on and transferred between reels 3 and 5. During the tape transfer the tape is presented along an edge 7 of the cartridge which, with the cartridge installed in the recorder, faces a recording and playback head 9. In operation the tape may be moved, at recording/playback speed, in either direction by driving reels 3 and 5 as appropriate to respectively permit playback and recording on a first or second portion of the tape; the tape portions defining single or plural tracks or channels.

The cartridge 1 is provided, on the edge 11 disposed opposite to edge 7, with means which respectively provide an indication as to whether recording is to be prevented on the first and second portions or tracks. The indication providing means constitutes a removable tab 13 for the first track and a removable tab 13' for the second track. In the manner now well known in the art, the sensing of the absence of either of tabs 13 and 13' will institute a control function which prevents recording on the associated track or tracks on the tape.

The means for sensing the presence or absence of tab 13 on cartridge 1 comprises a projection or catch 17 on a first end of a slide mechanism indicated generally at 19. Movement of the slide mechanism 19 is guided by engagement of slots in the slide by a pair of stationary lugs or pins 21 and 23. The slide mechanism 19 is urged toward edge 11 of cartridge 1 by means of a spring 25. FIGS. 1 and 2 respectively show the positions which will be assumed by the slide mechanism 19, presuming that the tape is being driven in the first direction so as to present the first track to recording head 9, depending on whether the projection 17 is stopped by tab 13 or whether the tab has been removed thus permitting the projection 17 to be engaged in a recess provided in the edge 11 of cartridge 1; the latter position being commensurate with detection of the necessity of preventing recording.

The slide mechanism 19 is also provided with a camming projection 26 which extends in a direction generally transverse to the projection 17. The slope 27 of cam projection 26 cooperates with a pin 31 which extends from a second slide mechanism or member 29 which serves as a displaceable output member; slide mechanism or member 29 is oriented transversely to slide mechanism 19. Movement of slide member 29 is guided by a pair of slot engaging pins or lugs 33, 35 which are affixed to the frame of the tape recorder. Movement of slide mechanism 19, resulting from the action of spring 25 with tab 13 removed, will cause slide member 29 to be displaced to the left as the apparatus is shown in the drawing due to the camming action of projection 26 upon pin 31. A pin 37 affixed to slide member 29 contacts a spring loaded pivotal latch 39; latch 39 pivoting about axis 41. Movement of slide member 29 to the left thus causes counterclockwise rotation of latch 39.

As may be seen from joint consideration of FIGS. 1 and 2, the counterclockwise pivoting of latch 39 results in the unlatching of a further spring loaded slide member or bar 46 which serves as a recording function indicator. The slide bar 46 carries, at a first end thereof, an element 43 which, upon unlatching, moves from the position shown in solid lines in FIG. 1 to the position shown in broken lines thus providing an indication that recording is to be prevented. The slide bar 46 has an arm 47 extending therefrom for engagement by a biasing spring 45; the spring 45 causing the movement of bar 46 upon the unlatching thereof. The arm 47 of bar 46 further actuates the slide member 49 of an electrical switch. As depicted in FIG. 1, the electrical circuit between the contacts 51 and 52 of the switch are completed by member 49 when the tab 13 is present in cartridge 1 and recording is permitted. When the switch member 49 moves to the position shown in FIG. 2, commensurate with the absence of tab 13, electrical contact is established between fixed position contacts 52 and 53 and recording will be prevented.

To summarize the preceding discussion, the movement of the element 43 upon unlatching of slide bar 46 produces a signal indicative of the fact that recording is to be prevented. This signal may, for example, result in the ejection of the cartridge from the tape recorder. Alternatively, an audible or visual alarm may be energized. This "recording prevention" function is particularly important in the case of reversal of the direction of travel of the tape, as will be indicated below, and it may be accompanied by a stopping of the winding of the tape.

The apparatus described above is, in principle, analogous to equipment known in the prior art. Thus, if a cartridge is turned over after the tape has been transferred from reel 3 to reel 5, apparatus of the type above-described enables verification of whether recording is permissible for the track corresponding to the inverted position of the cartridge due to the fact that the tab 13' will be presented to the detecting apparatus including the slide mechanism 19.

If the tape recorder has the capability of recording in both directions of tape transfer; i.e., if the direction of tape travel at the normal recording speed can be reversed without turning over the cartridge; it is of course necessary to determine the possible absence of both of tabs 13 and 13'. In accordance with the present invention there is provided means responsive to the direction of travel of the tape for sensing the presence or absence of both of tabs 13 and 13'.

It is customary to control the direction of travel of a tape by means of a device such as the slotted tape direction control slide mechanism indicated generally at 61 in FIGS. 1–3. The direction of movement of the slide mechanism 61 is guided by lugs 63 and 65 fixed to the frame of the tape recorder and engaged in slots in the slide mechanism. The tape direction control slide mechanism 61 may assume either the position I of FIGS. 1 and 2 or the position II of FIg. 3. The shifting of the tape direction control slide mechanism 61 from position I to position II, and vice versa, may be accomplished manually or automatically when a tape has been completely transferred in one direction. Slide mechanism 61 is provided with a pair of cam projections 67 and 67' respectively having sloped portions 69 and 69'.

Apparatus in accordance with the present invention includes a second sensing means in the form of a slide mechanism, indicated generally at 19', which is identical to construction and operation to the above described slide mechanism 19. Thus, the slide mechanism 19' is provided with a tab detecting projection 17', a camming projection 26' with its camming surface 27', and an actuating spring 25'. Also, in accordance with the invention the slide member 29 is elongated and is provided with a pin 31' which cooperates with camming projection 26' on slide mechanism 19'.

The slide mechanisms 19 and 19' are respectively provided, adjacent the ends thereof disposed away from the tab sensing projections 17 and 17', with pins 71 and 71'. Pins 71 and 71' cooperate respectively with the camming projections 67 and 67' on the tape direction control slide 61. Thus, depending upon the position of the tape direction control slide 61, one of the sensing or detecting devices 19 or 19' is released from its associated camming projection 67 or 67' and enabled to move toward the cartridge, while the other sensing or detecting device is disabled. With the detecting device released, the projections 17 or 17' will, under the action of their associated biasing springs, detect the presence or absence or tab 13 or tab 13'.

The apparatus, in the position of FIGS. 1 and 2, operates such that the camming projection 67 releases the slide mechanism 19 which, in the dependence upon the absence or presence of tab 13 in the manner described above, interrupts or permits the recording operation. At this time the camming projection 67' has engaged the pin 71' and disabled the slide mechanism 19' and thus the detection of the presence or absence of tab 13' of cartridge 1 is prevented.

When the slide 61 is displaced into position II as shown in FIG. 3, the slope 69 of camming projection 67 engages the pin 71 of slide mechanism 19 and raises and holds slide mechanism 19 against the action of spring 25. Simultaneously, the pin 71' of slide mechanism 19' will be released from camming projection 67' and, under the action of spring 25', the projection 17' on the end of slide mechanism 19' is enabled to sense the presence or absence of tab 13' on cartridge 1. As depicted in FIG. 3, if tab 13' has been removed cooperation between the camming projection 26' on slide mechanism 19' and pin 31' on the slide 29 will, in the manner described above with respect to slide mechanism 19, cause either the unlatching of slide bar 46 or the retention of the slide bar in the unlatched position.

The signal provided by element 43 as a result of the action of slide mechanism 19' is of particular importance when the direction of travel of the tape is reversed; i.e., when the slide 61 is moved from position I to position II; and the projection 17' detects that recording is to be prevented for the new direction of tape movement. In fact, it is desirable that the user be immediately warned that recording has been interrupted.

Figure 4:
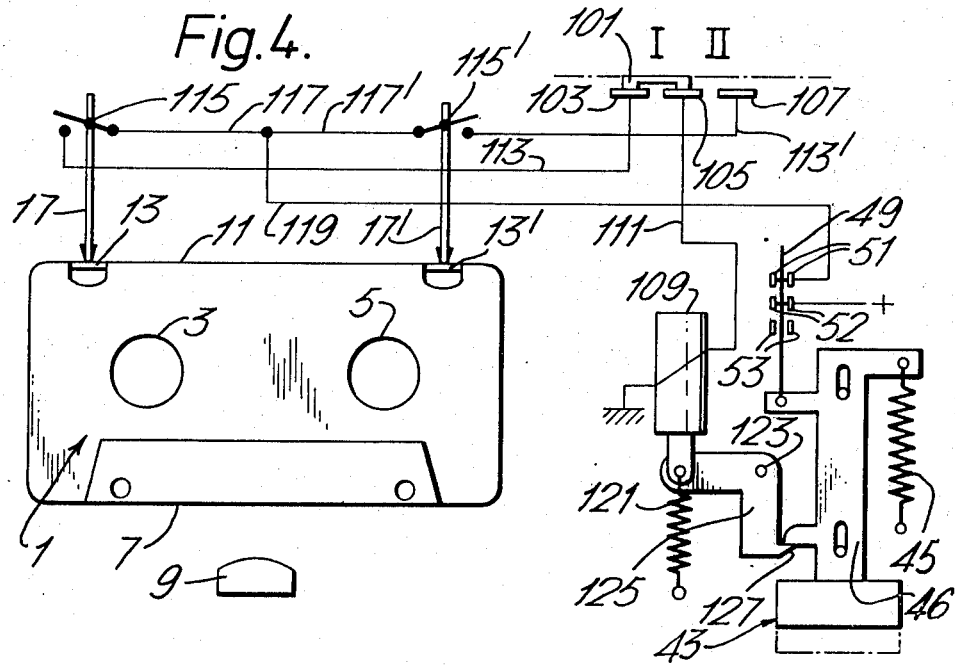
FIG. 4 is a schematic view of an electromechanical control device in accordance with a second embodiment of the invention.

FIG. 4 is a schematic representation of a second embodiment of the present invention employing electromechanical components. In FIG. 4 the erasure prevention detector device projections 17 and 17', the switch slide member 49 and the switch contacts 51, 52 and 53 operate in the same manner as and perform the same function as described above in the discussion of the embodiment of FIGS. 1-3. The FIG. 4 embodiment, rather than employing a mechanical slide to change the direction of tape transfer, includes as a tape direction control slide a change-over switch member 101 which cooperates with stationary contacts 103, 105 and 107 and switches 115, 115'. The switch member 101 may be moved between position I and position II respectively commensurate with the two directions of tape travel to connect the stationary terminals of one of the switches 115 or 115' to the central stationary contact 105 of the switch member through one of the conductors 113 or 113' and thus to enable one of the switches 115, 115' and disable the other of the switches in each position of the switch member. The stationary contact 105 is connected to the solenoid of a relay 109 by means of a conductor 111.

With the change-over switch member 101 in position I, an electrical circuit may be established between a power source, not shown but connected to stationary switch contacts 52, and relay solenoid 109 via switch member 49, contacts 51, conductor 119, conductor 117, enabled switch 115, conductor 113, contact 103, switch member 101, contact 105 and conductor 111. The movable element of the enabled switch 115 is mechanically coupled to the detector or sensing device which includes projection 17 is a displaceable input member, and thus the closed or open state of switch 115 will be commensurate with the presence or absence of tab 13. As shown in FIG. 4 the tab 13 is present in cartridge 1 and thus switch 115 will be open and the solenoid 109 will remain deenergized. Operation of the solenoid and the associated control apparatus will be described below.

In position II of the change-over switch member 101 an electrical circuit may be completed between the current source connected to stationary contact 52 and the solenoid 109 via switch member 49, contact 51, conductor 119, conductor 117', enabled switch 115', conductor 113', contact 107, switch member 101, contact 105 and conductor 111. The state of enabled switch 115' is commensurate with the presence or absence of tab 13' on cartridge 1; i.e., switch 115' is operated by slide 19' of FIGS. 1-3.

If either of the tabs 13, 13' has been removed from cartridge 1 the corresponding switch or switches 115, 115' will be closed by the movement of the associated projection 17, 17' into the recesses in the cartridge. The closing of either of switches 115 or 115', in cooperation with the circuit established by the position of the switch member 101, will cause energization of the solenoid of relay 109. The solenoid, when energized, operates in opposition to a biasing spring 121 to cause a latch member 125 to pivot about pivot point 123 whereby latching projection 127 is rotated out of engagement with slide bar 46. Upon being unlatched the slide bar 46, under the action of spring 45, is displaced so that the indicating element 43 moves from the position shown in solid lines to the position shown in broken lines. This interrupts the recording operation, in the manner described above in the description of FIGS. 1-3, and produces a signal indicating that recording has been interrupted or prevented.

While preferred embodiments have been shown and described, various modifications and substitutions may be made thereto without departing from the spirit and scope of the present invention. Accordingly, it is to be understood that the present invention has been described by way of illustration and not limitation.

What is claimed is:

1. In a tape recorder apparatus for the recording of information on a magnetic tape extending between reels in a cartridge, said apparatus having means for transporting the tape and recording on the tape in a cartridge in both directions of tape travel, the tape cartridge being provided with a pair of recesses corresponding respectively to each direction of tape travel and a removable tab over each recess, said apparatus having sensing and control means cooperating with said removable tabs for preventing recording in either direction of tape travel when the corresponding tab is absent, the improvement in said sensing and control means comprising:

a movable tape direction control slide having two positions corresponding respectively to the directions of tape travel, a first and second sensing means each including a movable slide mechanism mounted in said apparatus for sensing the absence of said removable tabs by movement into the recesses in the cartridge at the location of said tabs and a displaceable output member directly connected for displacement by the associated slide mechanism upon such movement, means for biasing each said slide mechanism against one of said tabs and to move into the recess in the absence of the tab, means actuated by said tape direction control slide for disabling one of said sensing means and for enabling the other of said sensing means to sense and produce an output reflecting the absence of the removable tab corresponding to the direction of tape travel by the slide mechanism moving into the recess in the cartridge at the location of said tab and displacing the associated output member, a movable recording function indicator, said indicator being slidably mounted and biased in one direction, a latching mechanism for said indicator operated in response to the displacement of the output member by said enabled sensing means to unlatch said indicator allowing it to move in the direction of bias, the unlatched condition of the recording function indicator providing an indication that tape recording is to be prevented.

2. The apparatus of claim 1, each said movable slide mechanism including means for guiding said slide mechanism for translational movement substantially perpendicular to the surface of the cartridge containing said removable tabs and said biasing means comprising springs which urge said slide mechanisms toward said tabs, each of said slide mechanisms assuming one position when the corresponding tab is present and another position when the corresponding tab is absent, each of said slide mechanisms having a camming projection thereon engaged by cam means on said tape direction control slide to disable one of said slide mechanisms in each position of said control slide, for disabling one of said sensing means and enabling the other sensing means corresponding to the direction of tape travel, and said displaceable output member associated with each of said slide mechanisms comprising a shiftable bar for operating said latching mechanism, said shiftable bar having cam elements cooperating with cam projections on said slide mechanisms for shifting said bar in response to the movement of an enabled slide mechanism under the urging of its biasing spring into one position when the removable tab corresponding to the direction of tape travel is absent operating said latching mechanism to unlatch said recording function indicator, and a second position operating said latching mechanism to latch said recording function indicator when said removable tab is present.

3. The apparatus of claim 1, control switch means connected to and operated by said movable tape direction control slide, each said movable slide mechanism comprising a detector device mounted for translational movement substantially perpendicular to the surface of the cartridge containing said removable tabs, each of said detector devices assuming one position when the corresponding tab is present and another position when the corresponding tab is absent, and said displaceable output member associated with each of said detector devices comprising a movable electrical switch element operated by the associated detector device, each said electrical switch element having two terminals associated therewith which are conductively closed upon displacement of said switch element when the corresponding removable tab is absent, each said switch element and associated terminals forming an electrical switch, said control switch means being connected to a power source and operable to connect said source to a terminal of and enable one of said electrical switches and to disconnect said source from and disable the other electrical switch in each position of said control slide, for disabling one of said sensing means and enabling the other sensing means corresponding to the direction of tape travel, said latching mechanism including a solenoid electrically connected to and actuated by said electrical switches, said solenoid being shifted into one state by the closing of the enabled electrical switch when the removable tab corresponding to the direction of tape travel is absent operating said latching mechanism to unlatch said recording function indicator, and shifted into a second state operating said latching mechanism to latch said recording function indicator when said removable tab is present.

* * * * *